Feb. 14, 1939.   R. L. BARRETT   2,147,080
THREADLESS BOLT AND NUT ASSEMBLY
Filed July 29, 1937
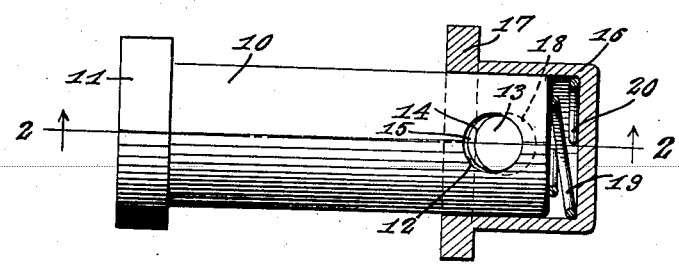
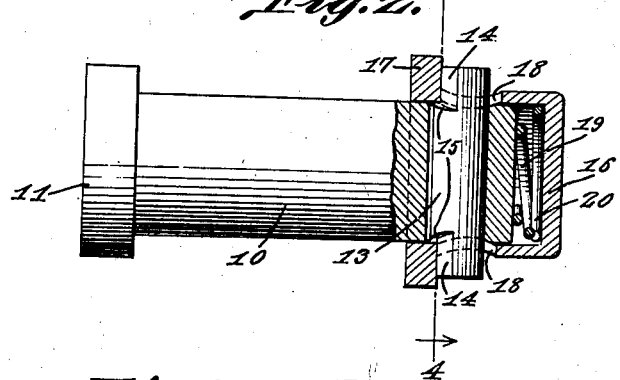
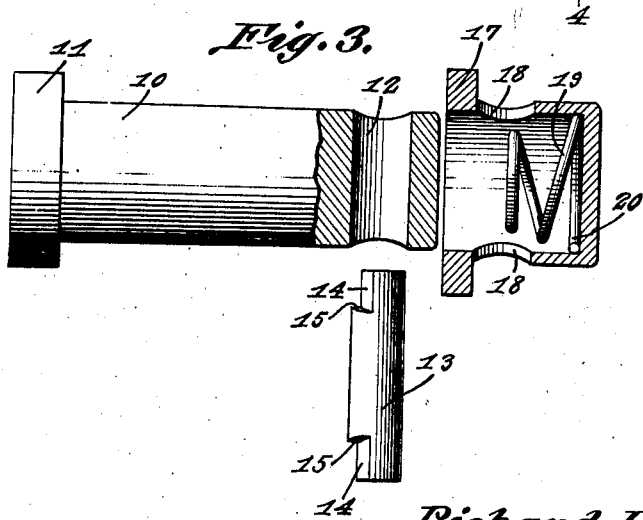
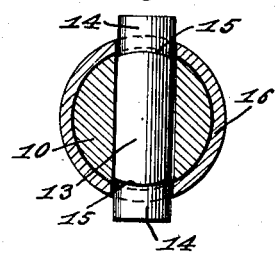
Richard L. Barrett, INVENTOR
BY Victor J. Evans & Co.
ATTORNEYS Patented Feb. 14, 1939

2,147,080

UNITED STATES PATENT OFFICE 2,147,080

THREADLESS BOLT AND NUT ASSEMBLY

Richard L. Barrett, East Carnegie, Pa.

Application July 29, 1937, Serial No. 156,402

1 Claim. (Cl. 85—5)

This invention relates to a threadless bolt and nut assembly and has for an object to provide a quick action device which will be devoid of threads or cotter pins and will require no tools to apply or remove.

A further object is to provide a device in which the nut is locked to the bolt by a single solid key which may be applied or removed by manual movement of the nut against the pressure of a spring housed in the nut.

A further object is to provide a device of this character which will be formed of only four simple parts, which will be inexpensive to manufacture, and which will not easily get out of order.

With the above and other objects in view the invention consists of certain novel details of construction and combinations of parts hereinafter fully described and claimed, it being understood that further modifications may be resorted to within the scope of the appended claim without departing from the spirit or sacrificing any of the advantages of the invention.

In the accompanying drawing forming part of this specification,

Figure 1 is a side elevation of a threadless bolt and nut assembly constructed in accordance with the invention, the nut being shown in section.

Figure 2 is a top plan view of the device shown in Figure 1 and showing parts broken away to expose the interlocking shoulders of the key and flange of the nut.

Figure 3 is a view similar to Figure 2 but showing the parts in separated condition.

Figure 4 is a cross sectional view taken on the line 4—4 of Figure 2.

Referring now to the drawing in which like characters of reference designate similar parts in the various views, 10 designates a bolt having a head 11 at one end and having the cylindrical surface of the opposite end smooth. An opening 12 is formed transversely of the last named end of the bolt.

A solid metal cylindrical key 13 is adapted to be slid endwise through the opening 12. The key is provided on one side, at both ends, with cut away portions 14 which produce shoulders 15.

A smooth bore cap nut 16 of substantially the same diameter as the bolt, is provided with a cylindrical flange 17 provided at diametrically opposite points with openings 18 which are adapted to align with the opening 12 of the bolt and permit insertion of the key 13 endwise through the bolt and through the nut to lock the nut against rotation on the bolt.

A helical spring 19 is frictionally held in the bottom of the nut by engagement of its base convolution 20 with the inner wall of the nut. The spring is substantially conical in contour and when expanded extends to about the openings 18 of the cap nut. In use the spring tends constantly to force the nut longitudinally away from the bolt and thereby hold the flange 17 of the bolt fitted in the cut away portions 14 of the key in which position of the parts the shoulders 15 engage the inner cylindrical surface of the nut at the flange and positively prevent the key being dislodged endwise in either direction from applied position.

It is simply necessary to manually move the nut 16 longitudinally of the bolt to compress the spring 19 sufficiently to dislodge the locking shoulders 15 from engagement with the inner surface of the nut whereupon the key may be removed endwise to separate the nut from the bolt. To apply the nut and key the nut is placed on the bolt and its openings 18 are aligned with the opening 12 in the bolt and during such movement the spring 19 is compressed against the end of the bolt. The key 13 is now slid endwise through the opening 12 of the bolt and openings 18 of the nut whereupon the pressure on the nut may be released to permit the spring to expand and withdraw the nut 16 to lodge the flange 17 thereof in the cut away portions 14 of the key and engage the locking shoulders 15 of the key with the inner surface of the nut.

From the above description it is thought that the construction and operation of the invention will be fully understood without further explanation.

What is claimed is:

A threadless bolt and nut assembly comprising a bolt having a head at one end and having the opposite end formed smooth and cylindrical, there being an opening disposed transversely in said cylindrical end and opening through the sides thereof, a cap having a cylindrical flange provided at diametrically opposite points in the side with openings adapted to register with the opening in the bolt when the bolt is telescoped into the cap, a cylindrical key of less diameter than the diameter of the opening in the bolt having the ends cut away on one side to provide shoulders, said key being insertable endwise through the aligned openings in the flange of the cap and in the bolt, and a helical spring having a base convolution secured in said cap at the closed end thereof and having the free end adapted to exert pressure upon said bolt and tend to force the nut away from the bolt to move said shoulders into engagement with the inner face of the cylindrical flange of the nut and lock the bolt against accidental endwise dislodgment.

RICHARD L. BARRETT.